(12) United States Patent  (10) Patent No.: US 7,017,164 B2
Iwaasa  (45) Date of Patent: Mar. 21, 2006

(54) DISK DEVICE

(75) Inventor: Hiroaki Iwaasa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 354 days.

(21) Appl. No.: 10/309,117

(22) Filed: Dec. 4, 2002

(65) Prior Publication Data

US 2003/0103423 A1 Jun. 5, 2003

(30) Foreign Application Priority Data

Dec. 5, 2001 (JP) ............................ P2001-371223

(51) Int. Cl.
*G11B 17/03* (2006.01)

(52) U.S. Cl. .................................................... 720/607

(58) Field of Classification Search ............. 369/30.45, 369/30.85; 720/607
See application file for complete search history.

(56) References Cited

U.S. PATENT DOCUMENTS 6,151,279 A * 11/2000 Ikedo et al. ............. 369/30.98

FOREIGN PATENT DOCUMENTS

JP 10-49959 2/1998

* cited by examiner

*Primary Examiner*—George Letscher
(74) *Attorney, Agent, or Firm*—Morgan Lewis & Bockius LLP

(57) ABSTRACT

A disk device has a slide tray, rotary tray and chucking mechanism. A motive gear attached to the slide tray has an engaging pin. On the rotary tray, a Geneva gear operating in cooperation with the engaging pin is provided. In a motive gear, a cam groove and a cam member for controlling ON and OFF of chucking operation are provided. In a device body, there are provided a rack for taking in and out and a guide groove. There are provided a central gear driven by motor and an idler gear meshed with the central gear. According to a rotation direction of the motor, the idler gear is selectively meshed with the motive gear or the rack.

9 Claims, 12 Drawing Sheets

DISK DEVICE

BACKGROUND OF THE INVENTION

1. Field of the Invention

The present invention relates to a disk device, particularly to a disk device on which a rotary disk exchanger mechanism is mounted.

2. Description of the Related Art

In this type of disk device, a rotary tray having a plurality of disk setting sections in the circumferential direction is mounted on a slide tray which is taken in and out from a device body. A disk which is set at each disk setting section on the rotary tray is chucked by a chucking mechanism at a disk scanning position when rotation of the rotary disk is stopped. An operation of taking in and out the slide tray, an operation of rotating the rotary tray so as to move a disk, which is set at a predetermined disk setting section, to a disk scanning position and an operation of chucking on and off at the disk scanning position are all conducted by utilizing power generated by motors.

In this type of disk device, it is conventional that a rotary operation of the rotary tray and an operation of chucking on and off by the chucking mechanism are conducted by one motor. However, three operations including a rotary operation of the rotary tray, an operation of chucking on and off by the chucking mechanism and an operation of taking in and out the slide tray are not conducted by one motor.

On the other hand, in Japanese Unexamined Patent Publication No. 10-49959, there is a description of a disk player in which three operations including a rotary operation of the rotary tray, an operation of chucking on and off by the chucking mechanism and an operation of taking in and out the slide tray are conducted by one motor.

This disk player is composed as follows. Power generated by one motor is transmitted to a planetary gear mechanism including an internal gear, the diameter of which is large, and a planetary gear revolving while rotating round its own axis being meshed with the internal gear. Revolution of the planetary gear of the planetary gear mechanism is transmitted to a Geneva gear arranged on a rotary tray, so that the rotary tray is intermittently rotated. At the same time, in cooperation of a cam plate, which is revolved by the revolution of the planetary gear, with an elastic member, a chucking operation by the chucking mechanism is controlled being turned on and off. When the planetary gear of the planetary gear mechanism is locked at a predetermined position so as to stop the revolution of the planetary gear, rotation of the planetary gear round its own axis is converted into a linear motion of a rack used for taking in and out the slide tray. Due to the foregoing, the slide tray can be taken in and out. When the chucking mechanism is changed over from a state of chucking off to a state of chucking on, a cam protrusion provided in the chucking mechanism is disengaged from the cam plate. In accordance with that, a turn table of the chucking mechanism lifts a disk set on the rotary tray upward, by an elastic force of the elastic member. Due to the foregoing, the chucking mechanism is changed over from a state of chucking off to a state of chucking on.

According to the above former conventional disk device, two motors are required. One is a motor which rotates the rotary tray and chucks on and off by the chucking mechanism. The other is a motor which takes in and out the slide tray. Therefore, the manufacturing cost is raised.

On the other hand, according to the latter disk device described above, three operations including a rotary operation of the rotary tray, an operation of chucking on and off by the chucking mechanism and an operation of taking in and out the slide tray are conducted by one motor. Therefore, the number of motors, which are required for the disk device, can be reduced compared with the above conventional disk device. Therefore, it is possible to reduce the manufacturing cost necessary for the motor.

However, the latter disk device uses the planetary gear mechanism provided with the internal gear. Further, in the disk device, the chucking mechanism is turned on and off in cooperation of the cam plate with the elastic member. Therefore, the following problems may be encountered in the disk device.

In the planetary gear mechanism, the internal gear and the planetary gear are combined with each other, and when rotation of the planetary gear meshed with the internal teeth of the internal gear is transmitted, the planetary gear is rotated and revolved. Accordingly, there is a restriction in suppressing a gear ratio of the internal gear to the planetary gear, and the freedom of selecting the gear ratio is remarkably limited.

Since the chucking operation is turned on and off in cooperation of the cam plate with the elastic member, when a state in which the chucking mechanism is turned off is changed over to a state in which the chucking mechanism is turned on, the turn table of the chucking mechanism lifts the disk set on the rotary tray from its setting position in a rush manner. Therefore, when the disk is chucked (clamped) by the chucking mechanism, an impact shock is generated. Thus the disk interferes with the rotary tray by the shock, which causes a problem. Further, the following problems may be encountered. Since an elastic force generated by the elastic member fluctuates, when the disk is chucked by the elastic force generated by the elastic member so that recording or playback can be conducted, the rotating disk oscillates and interferes with the rotary tray. This deteriorates stability of recording or playback.

SUMMARY OF THE INVENTION

An object of the present invention is to provide a disk device in which three operations including a rotary operation of the rotary tray, an operation of chucking on and off by the chucking mechanism and an operation of taking in and out the slide tray are conducted by one motor, without using a conventional planetary gear mechanism having an internal gear and an elastic force of the elastic member for chucking on and off. The disk device is capable of solving the aforementioned problems of the layout and deterioration on stability of recording and playback.

It is another object of the present invention to provide a disk device capable of continuously conducting an operation of taking in and out (opening/closing) the slide tray, an operation of rotating the rotary tray intermittently and an operation of chucking on and off by the chucking mechanism at an appropriate timing.

According to an aspect of the invention, there is provided a disk device comprising: a slide tray taken in and out from a device body; a rotary tray mounted on the slide tray, the rotary tray having a plurality of disk setting sections arranged in the circumferential direction thereof; and a chucking mechanism attached to the slide tray for chucking a disk which is set in the disk setting section at a disk scanning position, wherein an intermittent rotation of the rotary tray, an operation of taking in and out the slide tray and chucking on and off of the chucking mechanism in the case of rotating and stopping the rotary tray are conducted by power generated by one motor.

The disk device further comprises: an operating section for intermittently rotating the rotary tray and turning on and off a chucking motion conducted by the chucking mechanism when the motive gear attached to the slide tray is rotated; a rack for taking in and out the slide tray, the rack arranged in the device body and extending in the direction of taking in and out the slide tray; and an idler gear rotated by the motor and selectively engaged with the motive gear or the rack for taking in and out when a direction of rotation of the motor is changed over.

According to the present invention, the idler gear is rotated by a motor. Further, when a direction of rotation of the motor is changed, the idler gear is selectively meshed with the motive gear or the rack for taking in and out. When the idler gear is meshed with the motive gear, rotation of the idler gear is transmitted to the motive gear. When the motive gear is rotated, the rotary tray is intermittently rotated and the chucking mechanism is turned on and off. When the idler gear is meshed with the rack for taking in and out, rotation of the idler gear is converted to a liner motion of the rack, so that the rack is taken in and out together with the slide tray. Accordingly, it is possible to conduct three operations including a rotary operation of the rotary tray, an operation of chucking on and off by the chucking mechanism and an operation of taking in and out the slide tray by one motor.

In the present invention, it is possible to adopt the following structure. The motor and the central gear rotated by the motor are arranged on the slide tray, and the idler gear is pivotally attached to a connecting member pivotally connected with a support shaft of the central gear so that the idler gear can be always engaged with the central gear. In the case of adopting the above structure, it is preferable that the disk device further comprises an idler gear posture maintaining member for maintaining a state of engagement of the idler gear with the rack when the slide tray is taken in and out, wherein the idler gear posture maintaining member is arranged in the device body. Due to the above structure, the idler gear is meshed with the rack for taking in and out. Therefore, the slide tray can be stably taken in and out. When the central gear is combined with the idler gear in the present invention so that power generated by the motor is selectively transmitted to the motive gear or the rack for taking in and out, it is possible to arbitrarily determine a gear ratio of the central gear to the idler gear. Therefore, the freedom of selecting the gear ratio can be enhanced.

In the present invention, it is possible to adopt the following structure. The idler gear posture maintaining member includes: a guide section arranged in the device body in parallel with the rack; and an engaging body arranged in the connecting member, slidably engaged with the guide section so as to prevent swinging of the connecting member around the support shaft.

In the present invention, it is possible to adopt the following structure. The chucking member is changed over between a state of chucking on and a state of chucking off by a reciprocating motion of the cam member, and the operating section includes a cam mechanism arranged in the motive gear, for reciprocating the cam member when the motive gear is rotated. Due to the above structure, a state in which the chucking mechanism is turned on and a state in which the chucking mechanism is turned off can be changed over by a reciprocating motion of the cam member. Accordingly, there is no possibility that a shock is caused in the process of turning on the chucking mechanism. Further, there is no possibility that the disk oscillates and interferes with the rotary tray when the disk is rotated (when recording or playback is conducted) under the condition that the chucking mechanism is turned on.

In the present invention, it is preferable that the operating section includes a gear mechanism for converting continuous rotation of the motive gear into intermittent rotation of the rotary tray. This gear mechanism may comprise an engaging pin, which is arranged on the motive gear side, and a Geneva gear having a groove section to which the engaging pin is attached and from which the engaging pin is detached. If the gear mechanism comprises the above engaging pin and the Geneva gear, during a time from the start to the stop of rotation of the rotary tray, the angular velocity is gradually increased and then gradually decreased. Therefore, even if the rotary tray is rotated at a high velocity, there is no possibility that a shock is caused at the start and stop of rotation. Further, there is no possibility that the disk is thrown away from the disk setting section on the rotary tray.

It is possible for the disk device of the present invention to adopt the following structure. A disk device comprises: a slide tray taken in and out from a device body; a rotary tray mounted on the slide tray, having a plurality of disk setting sections arranged in the circumferential direction of the rotary tray; and a chucking mechanism attached to the slide tray, for chucking a disk set in the disk setting section at a disk scanning position, wherein an intermittent rotation of the rotary tray, an operation of taking in and out the slide tray and chucking on and off of the chucking mechanism in the case of rotating and stopping the rotary tray are conducted by power generated by one motor, the disk device further comprises: a motive gear attached to the slide tray; a Geneva gear of a gear mechanism, which comprises an engaging pin provided on the motive gear side and the Geneva gear provided with a groove section to be engaged with and disengaged from this engaging pin, arranged on the rotary tray, so that continuous rotation of the motive gear can be converted into intermittent rotation of the rotary tray; an endless cam groove provided in the motive gear, for guiding an guide pin provided in a cam member so as to reciprocate the cam member so that the chucking mechanism is changed over between a state of chucking on and a state of chucking off; a rack for taking in and out the slide tray, extending in the direction of taking in and out the slide tray, arranged in the device body; a guide groove arranged in parallel with the rack for taking in and out; a central gear composed of a spur gear rotated by the motor, arranged on the slide tray at a position between the motive gear and the rack; a connecting member pivotally connected with a support shaft of the central gear so that the connecting member is relatively rotated; an idler gear composed of a spur gear engaged with the central gear at all times so that the spur gear can be selectively engaged with the motive gear or the rack for taking in and off when a direction of rotation of the central gear is changed over; and an engaging body for maintaining a state of engagement of the idler gear with the rack for taking in and out when the engaging body slides in the guide groove in the case of taking in and out the slide tray.

DETAILED DESCRIPTION OF THE PREFFERED EMBODIMENTS

Figure 1:
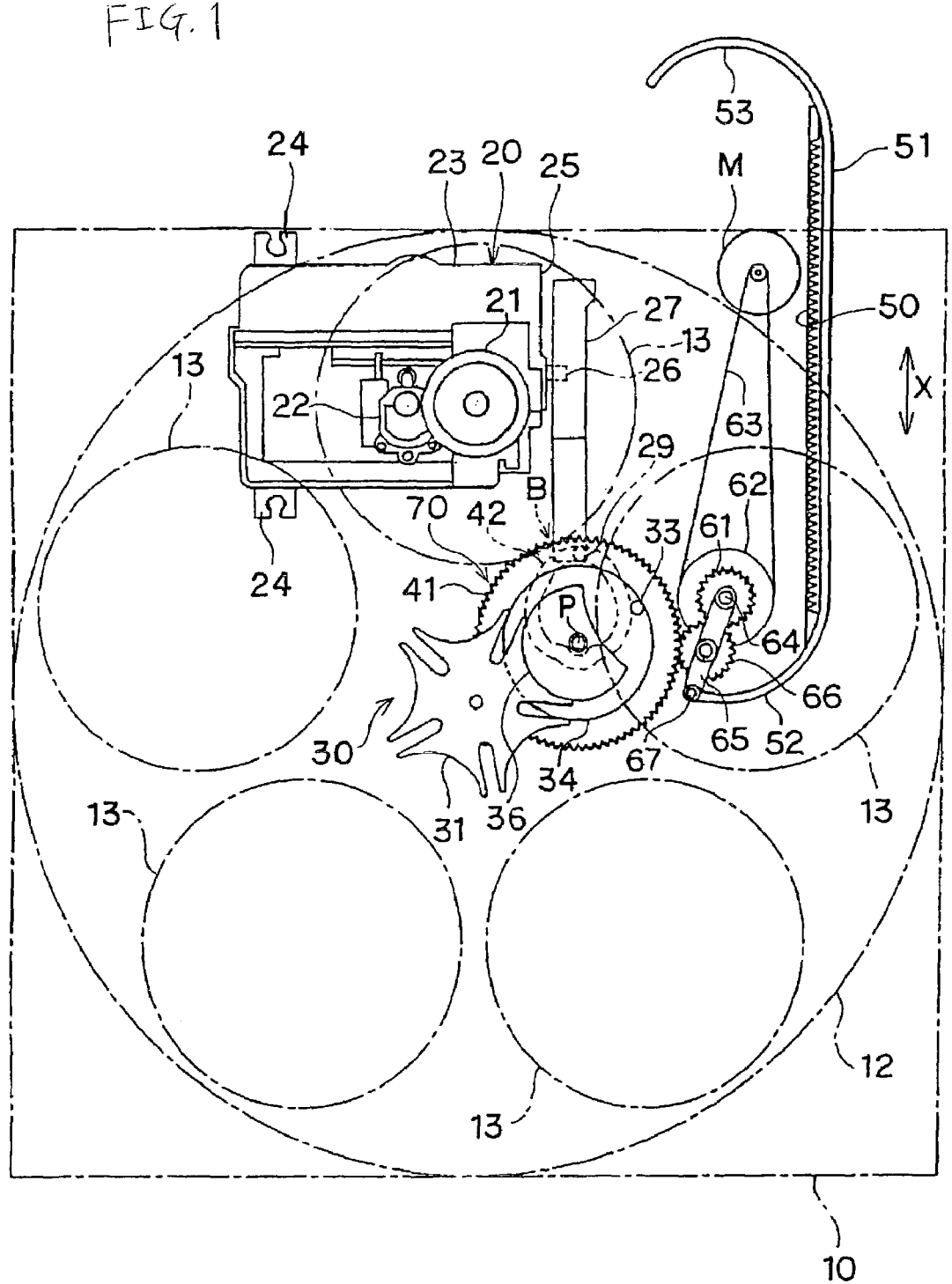
FIG. 1 is a schematic illustration of a portion of an embodiment of a disk device of the present invention.

FIG. 1 is a schematic illustration showing a primary portion of an embodiment of the disk device of the present invention. In FIG. 1, reference numeral 10 is a substantially rectangular slide tray. This slide tray is slidably attached to a device body not shown in the drawing. When this slide tray 10 is drawn out to the front from the device body, it is defined as an open state. When this slide tray 10 is drawn back into the device body, it is defined as a closed state. In FIG. 1, the slide tray 10 in the open state is shown. On this slide tray 10, there is provided a disk-shaped rotary tray 12 which is pivotally arranged. The rotary tray 12 includes a plurality of circular disk setting sections 13 which are arranged at a plurality of positions at regular angular intervals in the circumferential direction. In the example shown in the drawing, the plurality of circular disk setting sections 13 are arranged at five positions. Each disk setting section 13 is provided with an opening not shown in the drawing.

Figure 7:
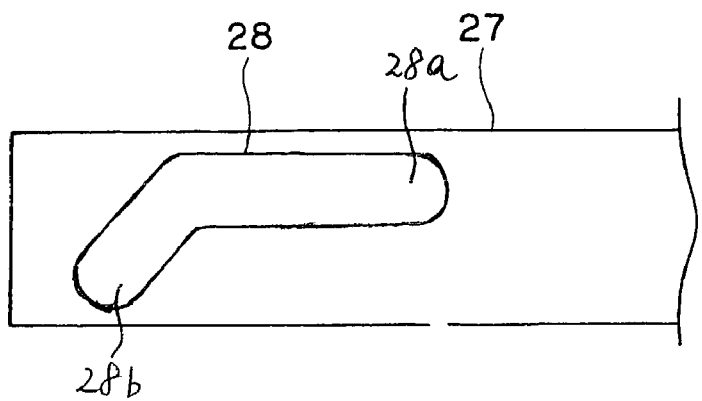
FIG. 7 is a schematic illustration for showing an example of the cam member.

As shown in FIG. 1, the chucking mechanism 20, which includes a turn table 21 and an optical pickup unit 22, is attached to the slide tray 10. This chucking mechanism 20 is provided with a movable frame 23. A support section 24 arranged at one end of this movable frame 23 in the traverse direction is supported by the slide tray 10, so that the other end portion 25 of this movable frame 23 in the traverse direction can be displaced upward and downward round the fulcrum of the support section 24. A protrusion 26 protruding from the other end portion 25 is engaged with a cam groove of a cam member 27 movably attached to the slide tray 10 in such a manner that the cam member 27 can be reciprocated in the front and rear directions of the slide tray 10. FIG. 7 is a view showing an example of the cam member 27. The cam groove 28 of the cam member 27 shown in the drawing includes a high level portion 28a and a low level portion 28b connected to one side of the high level portion 28a. When the protrusion 26 is engaged with the high level portion 28a, the movable frame 23 shown in FIG. 1 is inclined upward together with the turn table 21. When the protrusion 26 is engaged with the low level portion 28b, the movable frame 23 shown in FIG. 1 is inclined downward together with the turn table 21.

A Geneva gear 31 is fixed at the center of the rotary tray 12. An engaging pin 33 which is an opponent member of this Geneva gear 31 is arranged at an eccentric position on a disk 34 pivotally attached to the slide tray 10. Reference numeral 35 is a groove, which is formed in the Geneva gear 31, extending in the radial direction. When the engaging pin 33 is rotated round the center of the disk 34 in the normal or the reverse direction, the engaging pin 33 engages with the groove 35 and rotates the Geneva gear 31 and then gets out from the groove 35. The disk 34 is provided with a convex face 36 for positioning the Geneva gear 31 and guiding the engaging pin 33 into the groove 35. The Geneva gear 31 and the engaging pin 33 compose a gear mechanism 30 for converting continuous rotation of a motive gear 41, which will be described later, into intermittent rotation of the rotary tray 12.

Figure 6:
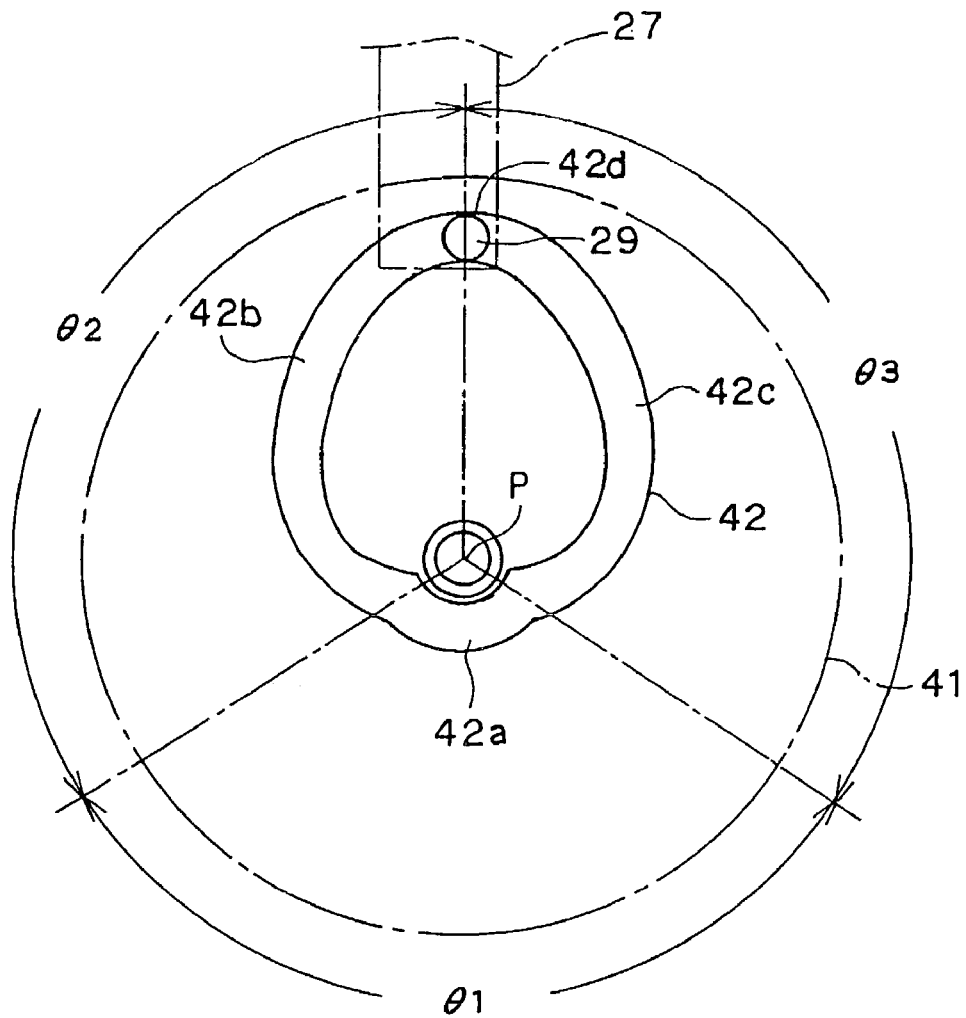
FIG. 6 is a schematic illustration for showing a profile of a cam groove.

The motive gear 41 is attached to the slide tray 10 coaxially with the disk 34. An endless cam groove 42 is formed on the reverse side of this motive gear 41. An engaging pin 29 arranged at an end portion of the cam member 27 is slidably engaged with this cam groove 42. Therefore, when the motive gear 41 is rotated, the cam member 27 is reciprocated in the front and rear directions in accordance with the profile of the cam groove 42 via the engaging pin 29 engaged with the cam groove 42. FIG. 6 is a view for explaining the profile of the cam groove 42. As can be seen in the drawing, the cam groove 42 is divided into three sections in the circumferential direction of the motive gear 41. The first section 42a is formed concentrically with rotary central axis P of the motive gear 41 at a position close to rotary central axis P. The second 42b and the third section 42c are continuously formed on both sides of the first section 42a symmetrically with each other with respect to the first section 42a. The second 42b and the third section 42c are most distant from rotary central axis P at a point 42d at which the second 42b and the third section 42c are connected with each other. The profiles of the second 42b and the third section 42c are formed in such a manner that the closer the position to the first section 42a from the connecting point 42d is, the closer the position to rotary central axis P becomes. Concerning the extending angles θ1, θ2 and θ3 shown in FIG. 6, θ2 and θ3 are identical with each other.

In FIG. 1, reference numeral 50 is a rack for taking in and out. This rack 50 is provided in the device body not shown in the drawing and extends straight in direction X in which the slide tray 10 is taken in and out. In the device body, there is provided a groove-shaped guide 51 in parallel with this rack 50 for taking in and out. In the front and the rear end portion of this guide 51, there are provided auxiliary grooves 52, 53 which are respectively shaped like an arc and curved inward.

As shown in FIG. 1, in a portion between the motive gear 41 and the rack 50 for taking in and out, the central gear 61, which is composed of a spur gear, and the pulley 62 are concentrically attached to the slide tray 10, and rotation of one motor M arranged on the slide tray 10 is transmitted to the pulley 62. There is provided an arm-shaped connecting member 65 connected with the support shaft 64 of the central gear 61, wherein the arm-shaped connecting member 65 can be freely rotated round the support shaft 64. To the middle portion of the arm-shaped connecting member 65 in the longitudinal direction, the idler gear 66 composed of a spur gear is pivotally attached. The idler gear 66 is meshed with the central gear 61 at all times. At the forward end portion of the connecting member 65, there is provided an engaging body 67 composed of a protrusion. This engaging body 67 is slidably engaged with the guide 51 or the auxiliary grooves 52, 53 at all times. An interval between the rack 50 for taking in and out and the central gear 61, which are opposed to each other, is determined so that the idler gear 66 can be simultaneously meshed with both of them.

Due to the above structure, normal rotation or reverse rotation of motor M is transmitted to the pulley 62 via a belt 63, and the central gear 61 is rotated in the normal or the reverse direction together with the pulley 62. When the central gear 61 is rotated in the normal or the reverse direction, while the idler gear 66 is being rotated round its own axis and being meshed with the central gear 61, the idler gear 66 is revolved round the central gear 61 clockwise or counterclockwise. In this case, the gear mechanism including the central gear 61 and idler gear 66, which are meshed with each other, can be said to be a type of planetary gear mechanism. In the structure adopted in this embodiment, the central gear 61 corresponds to the sun gear provided with external teeth, and the idler gear 66 corresponds to a planetary gear which is revolving round the sun gear being meshed with the external teeth of the sun gear. Therefore, it is possible to arbitrarily determine a gear ratio of the central gear 61 to the idler gear 66. A combination of the central gear 61 with the idler gear 66 is a type of swinging mechanism. Accordingly, when the direction of rotation of the central gear is changed over, the direction of rotation and that of revolution of the idler gear 66 are changed over. Therefore, when the direction of rotation of the central gear is changed over clockwise or counterclockwise, the idler gear 66 can be selectively meshed with the motive gear 41 or the rack 50.

In this embodiment, the idler gear posture maintaining member A (shown in FIG. 3) for maintaining the idler gear 66 to be meshed with the rack 50 comprises the guide 51, which is arranged in parallel with the rack 50, and the engaging body 67 arranged at the forward end of the connecting member 65. A cam mechanism B for reciprocating the cam member 27 via rotation of the motive gear 41 comprises the cam groove 42, which is arranged in the motive gear 41, and the guide pin 29 slidably engaged with the cam groove 42. By the function of the gear mechanism 30 described above, it is possible to intermittently rotate the rotary tray 12. By the cam mechanism B, it is possible for the chucking mechanism 20 to be turned on and off. The function of intermittent rotation of the rotary tray 12 conducted by the motive gear 41 and the function of turning on and off conducted by the chucking mechanism 20 are exhibited by the operating section 70 including the gear mechanism 30 and the cam mechanism B.

Next, the mode of operation will be explained below.

In FIG. 1, the disk device is in the initial state in which the slide tray 10 is drawn out to the front from the device body, that is, the slide tray 10 is in an open state, and the idler gear 66 is meshed with the motive gear 41.

Figure 2:
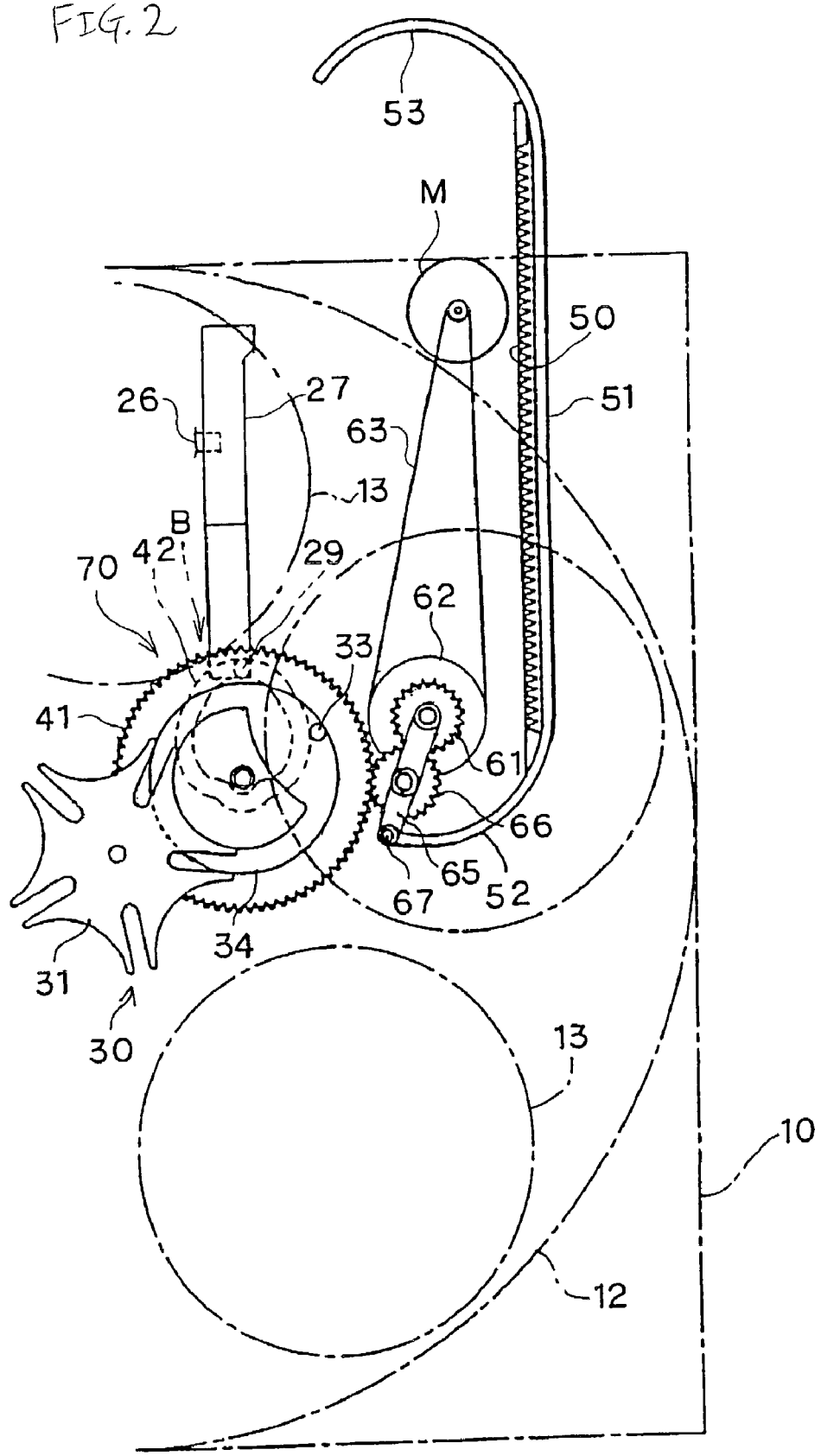
FIG. 2 is a schematic illustration for explaining an operation in an initial state in which an idler gear is meshed with a motive gear.

FIG. 2 is an enlarged view showing the primary portion of the device in the initial state. Explanations will be made in to an operation in which the slide tray 10 is taken into the device body from this initial state and then put into a closed state.

Figure 3:
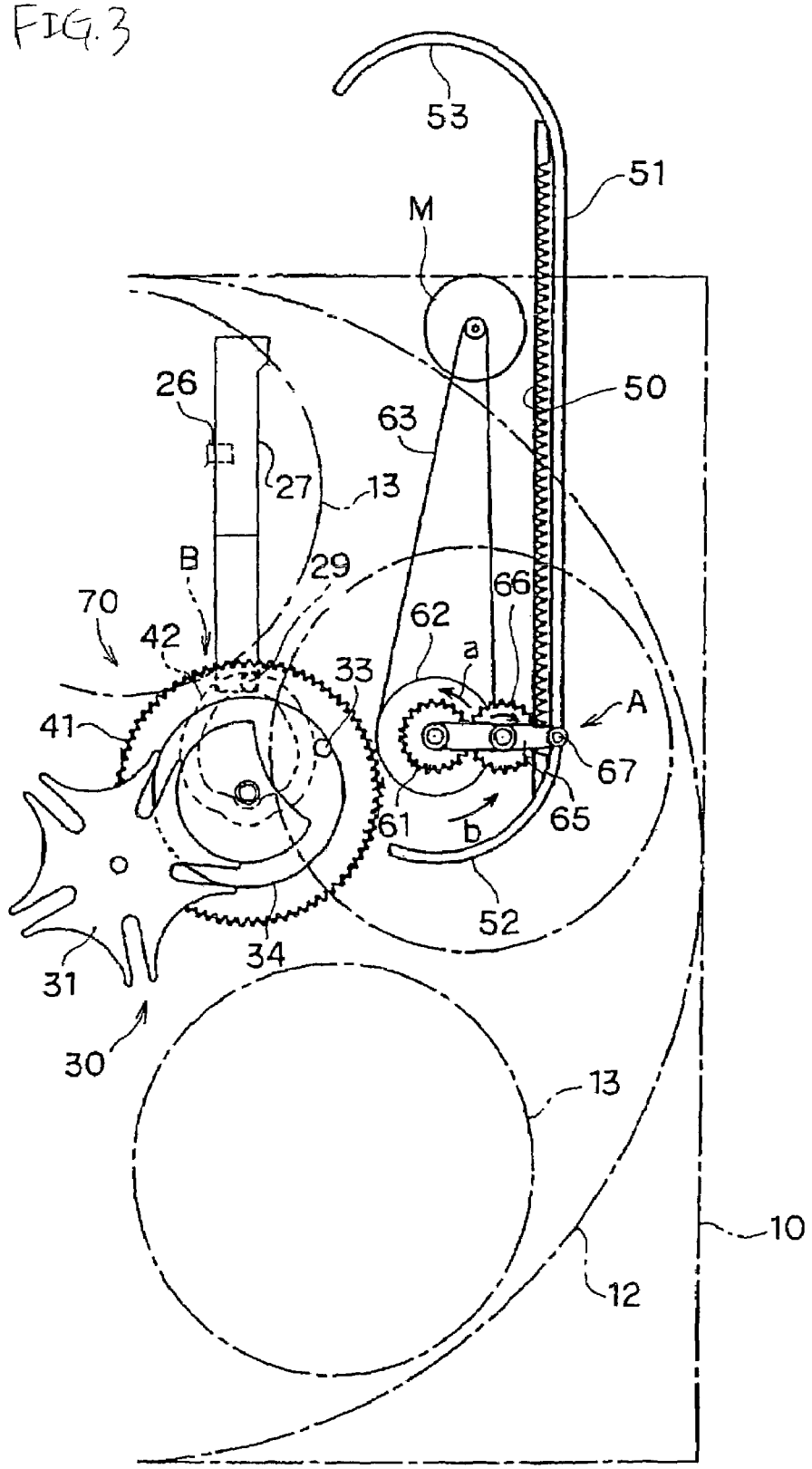
FIG. 3 is a schematic illustration for explaining an operation in a state in which the idler gear is meshed with a rack for taking in and out.
Figure 4:
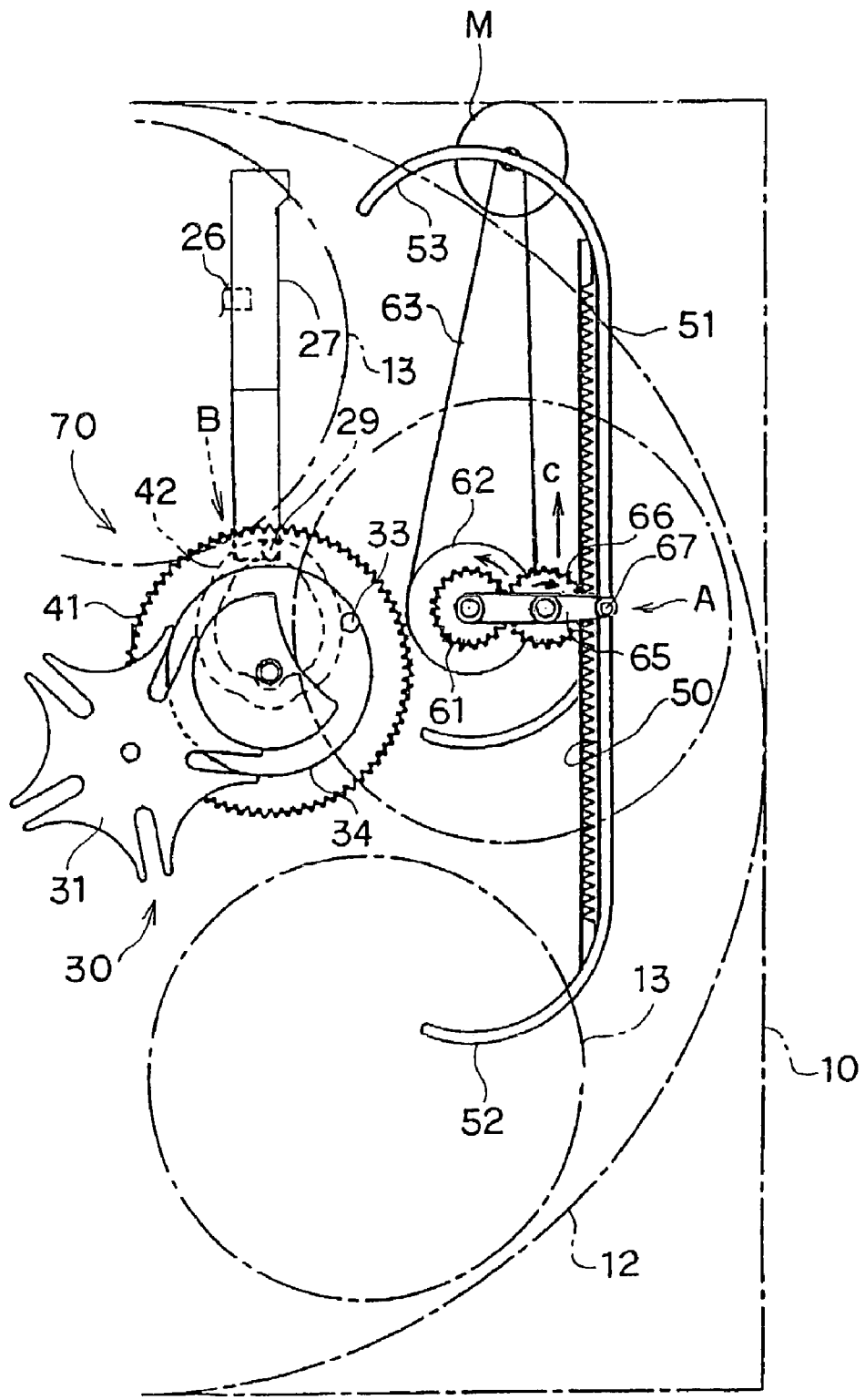
FIG. 4 is a schematic illustration for explaining another operation in a state in which the idler gear is meshed with the rack.

When motor M is reversed counterclockwise, reverse rotation of motor M is transmitted to the central gear 61 via the belt 63 and the pulley 62, so that the central gear 61 is reversed in the direction of arrow "a" shown in FIG. 3. Due to the foregoing, while the idler gear 66 is being meshed with the central gear 61, it is rotated clockwise round its own axis and revolved counterclockwise (in the direction of arrow "b") round the central gear 61, so that the idler gear 66 is meshed with one end portion (front end portion) of the rack 50. At the same time, the engaging body 67 arranged at the end of the connecting member 65 passes through the auxiliary groove 52 and engages with the guide 51. Therefore, the idler gear 66 is maintained in a state in which it is meshed with the rack 50. Accordingly, when the central gear 61 is being reversed, as shown in FIG. 4, while the idler gear 66 is being meshed with the rack 50, it is moved backward with respect to the rack 50 in the direction of arrow "c". Accordingly, the slide tray 10 is also moved backward and drawn inside the device body. In this way, the slide tray 10 is put into a closed state.

Figure 5:
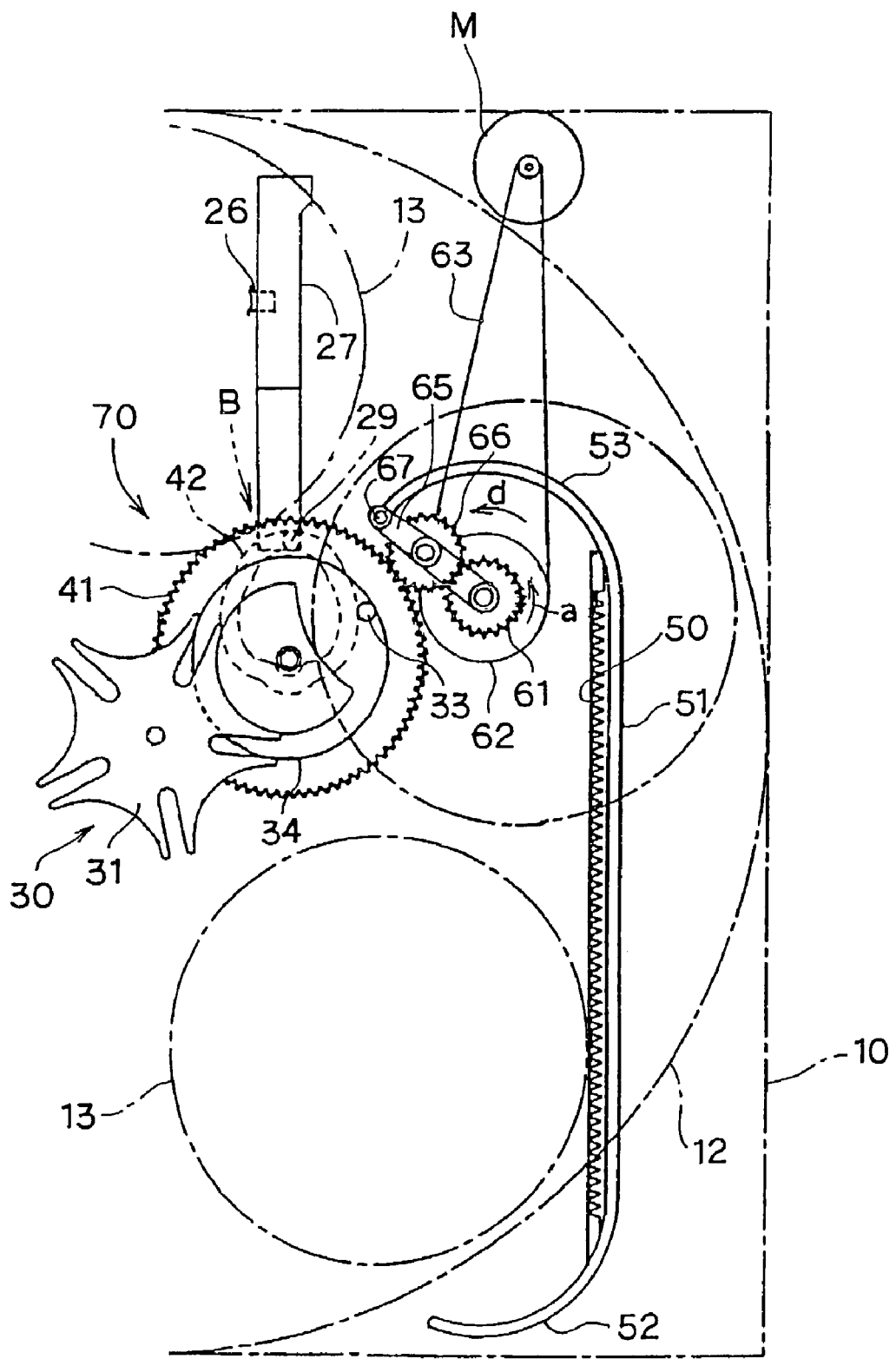
FIG. 5 is a schematic illustration for explaining an operation in a state in which the idler gear is meshed with the motive gear when a slide tray is closed.

At the point of time when the idler gear 66 passes through the other end portion (rear end portion) of the rack 50, the engaging body 67 moves from the guide 50 to the auxiliary groove 53, and the idler gear 66 is meshed with the motive gear 41 as shown in FIG. 5.

In the case where the slide tray 10 is drawn out to the front from the closed state shown in FIG. 5 to the open state, motor M is normally rotated. Due to the foregoing, the central gear 61 is normally rotated. Therefore, while the idler gear 66 is being meshed with the central gear 61, it is rotated round its own axis in the reverse direction and revolved clockwise round the central gear 61 and meshed with the other end of the rack 50 for taking in and out. After that, while the idler gear 66 is being meshed with the rack 50 for taking in and out, it moves forward with respect to the rack 50. Therefore, the slide tray 10 is also moved forward and drawn out to the front of the device body and returned to the initial state shown in FIG. 2. At this time, the engaging body 67 at the end of the connecting member 65 passes through the auxiliary groove 53 and then engages with the guide 51, so that the idler gear 6 can be maintained in the state in which it is meshed with the rack 50.

Next, explanations will be made into a rotating operation of the rotary tray 12 and a chucking operation conducted by the chucking mechanism 20.

FIGS. 8 to 12 are views showing operations of the cam mechanism B and the gear mechanism 30 for conducting a rotating operation of the rotary tray 12 and a chucking operation by the chucking mechanism 20 in the open state of the slide tray 10, that is, FIGS. 8 to 12 are views successively showing the procedure of the operating section 70.

Figure 8:
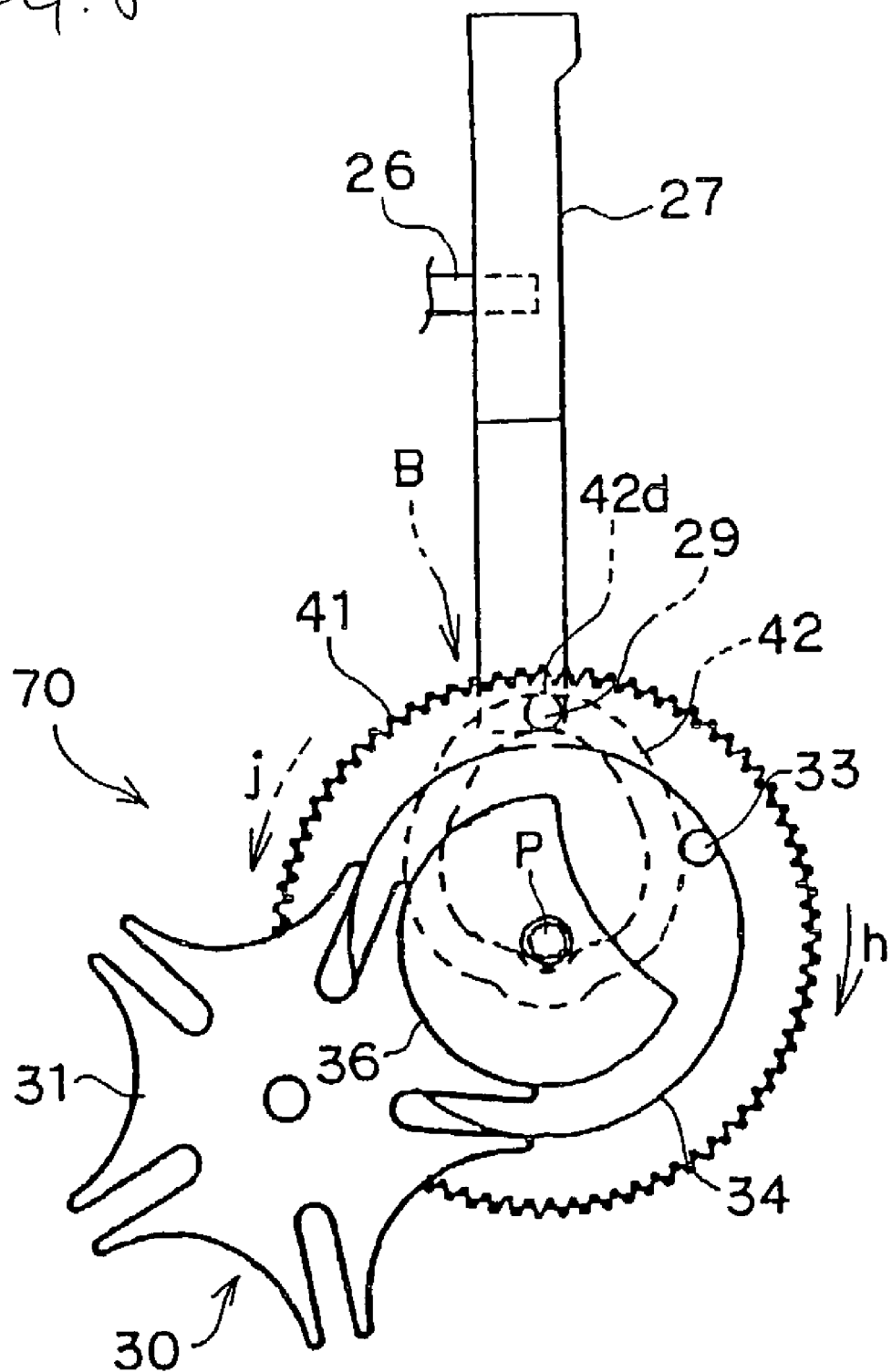
FIG. 8 is a schematic illustration for explaining an operation of an operating section.

In FIG. 8, the motive gear 41 is meshed with the idler gear 66 in the same manner as that shown in FIG. 2 in which the motive gear 41 is meshed with the idler gear 66. Accordingly, when motor M is normally rotated clockwise in FIG. 8 as explained in FIG. 2, the central gear 61 is normally rotated, so that the idler gear 66 is rotated counterclockwise round its own axis while the idler gear 66 is being meshed with the motive gear 41. Since a force is given to the idler gear 66 so that the idler gear 66 can be revolved clockwise round the central gear 61, the idler gear 66 can be maintained in a state in which the idler gear 66 is being meshed with the motive gear 41. Accordingly, the motive gear 41 starts normally rotating clockwise in the direction of arrow "h" shown in FIG. 8. At the point of time when the motive gear 41 start normally rotating in the direction of arrow "h", as shown in FIG. 8, the engaging pin 29 is engaged with the connecting point 42d (shown in FIG. 6) of the cam groove 42 of the cam mechanism B, that is, the engaging pin 29 is located at the most distant position from the rotary central axis P. Therefore, the cam member 27 is located at the retreat position, and the protrusion 26 is engaged with the high level portion 28a of the cam groove 28. Therefore, the chucking mechanism 20 is in ON state. The engaging pin 33 of the disk 34 is located at the most distant position from the Geneva gear 31.

Figure 10:
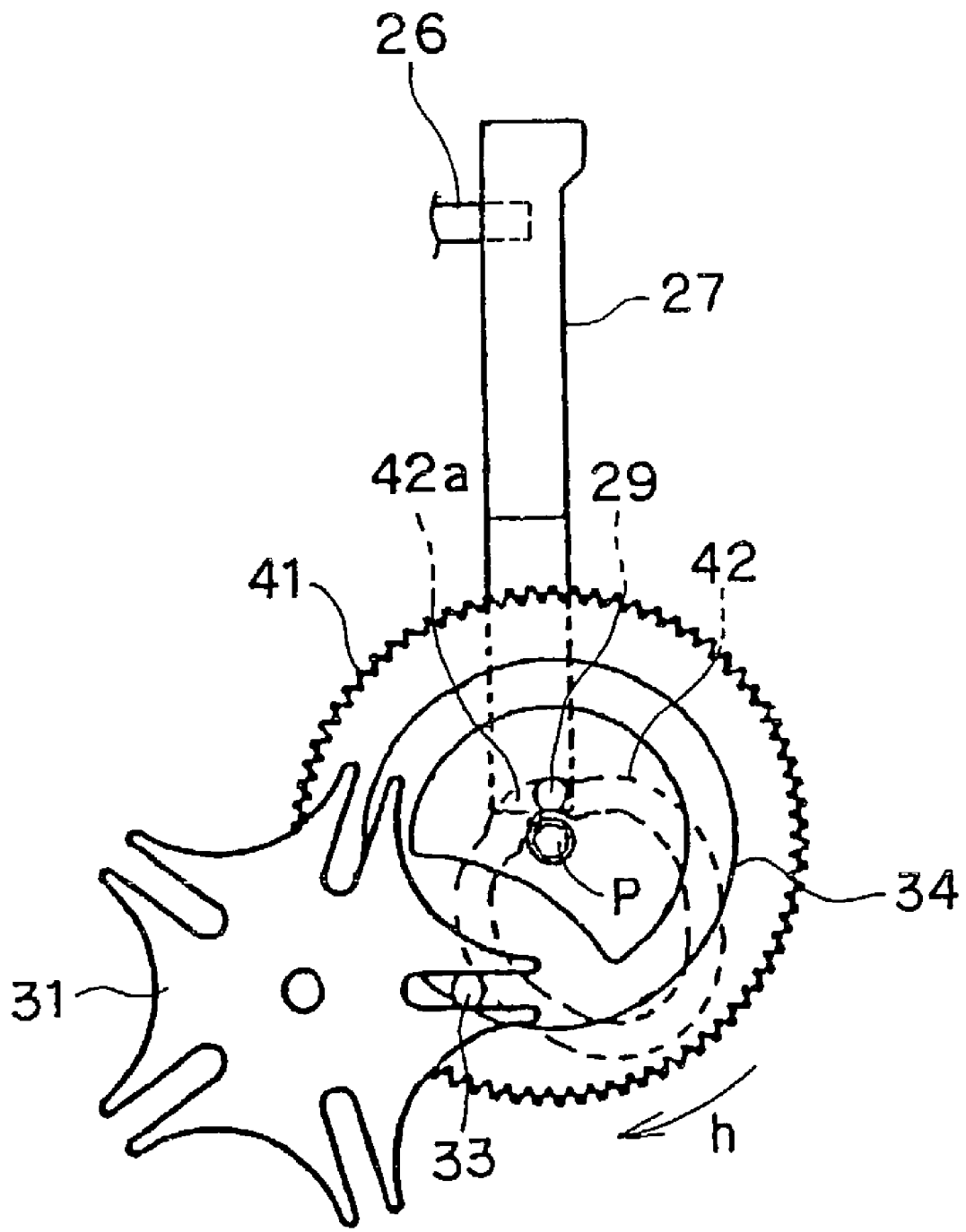
FIG. 10 is a schematic illustration for explaining still another operation of the operating section.

When the motive gear 41 is normally rotated in the direction of arrow "h" in FIG. 8, the disk 34 and the cam groove 42 are normally rotated round the rotary central axis P together with the motive gear 41. After that, at the point of time when the engaging pin 33 has arrived at a position right before the groove 35 of the Geneva gear 31, the engaging pin 29 moves in the second section 42b (shown in FIG. 6) of the cam groove 42 and arrives at a position right before the first section 42a. Successively, when normal rotation of the motive gear 41 is continued in the direction of arrow "h" as shown in FIG. 10, the engaging pin 33 gets into the groove 35 of the Geneva gear 31 as shown in the drawing. At the same time, the engaging pin 29 is moved from the second section 42b of the cam groove 42 to the first section 42a. In the above state, the engaging pin 29 comes to the closest position to the rotary central axis P of the motive gear 41. Therefore, the cam member 27 is moved to the advance limit, and the protrusion 26 is engaged with the low level portion 28b of the cam groove 28 explained in FIG. 7, and the chucking mechanism 20 is in OFF state. In the disk setting section 13, there is provided an opening which allows passage of the turn table 21 and makes it possible to scan the disk face by an optical pickup unit 22.

Figure 11:
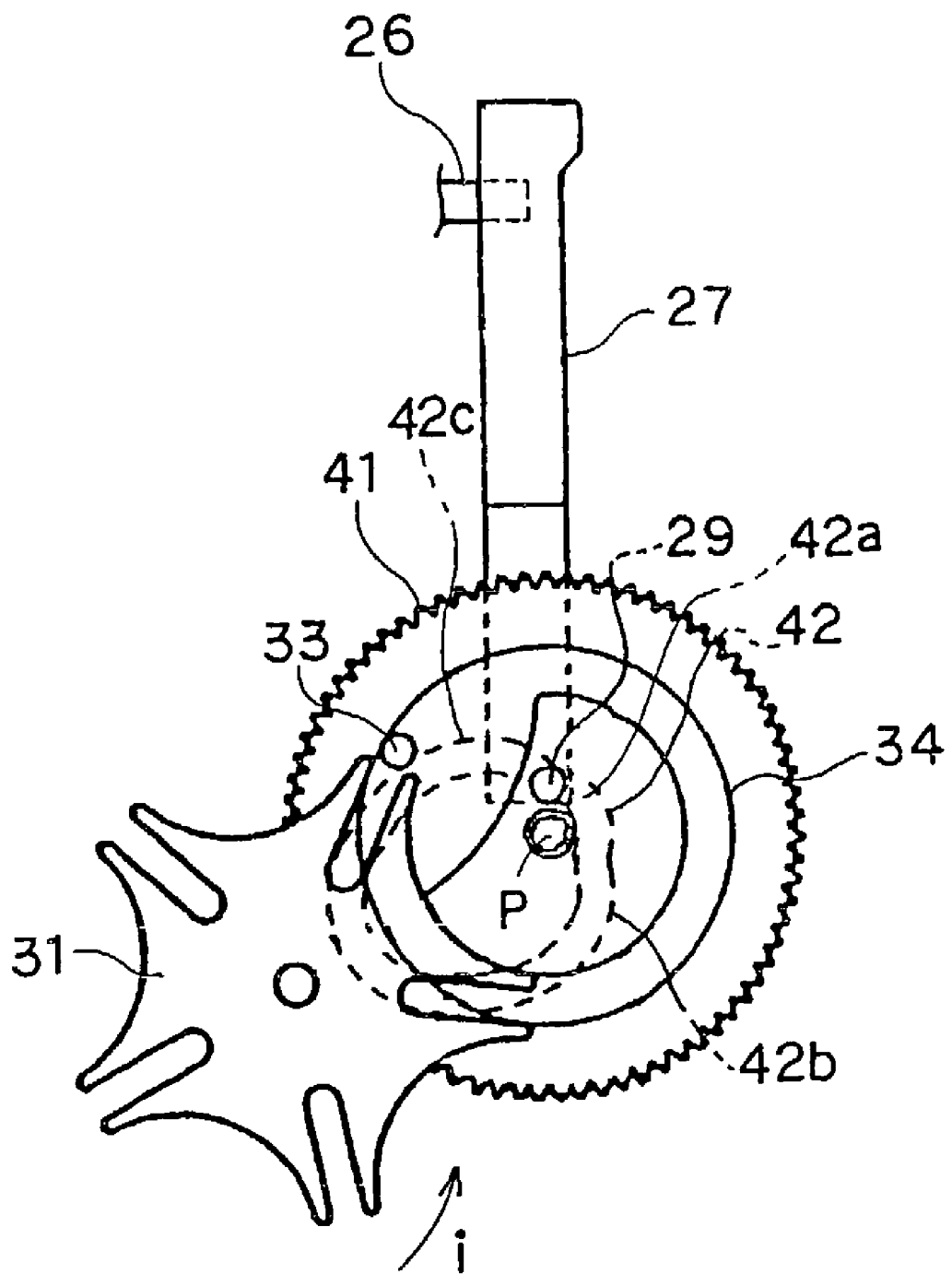
FIG. 11 is a schematic illustration for explaining still another operation of the operating section.

When the motive gear 41 is normally rotated in the state shown in FIG. 10, the engaging pin 33 rotates the Geneva gear 31 counterclockwise (in the direction of arrow "i") by a predetermined angle as shown in FIG. 11. At the same time, the engaging pin 29 is moved from the first section 42a of the cam groove 42 to the third section 42c. In the operation from the state shown in FIG. 9 to the state shown in FIG. 11 via the state shown in FIG. 10, a distance between the engaging pin 29 and the rotary central axis P is not changed. Therefore, the cam member 27 stops at the advance limit. The rotary tray 12 is rotated counterclockwise by a predetermined angle, and another disk setting section 13 is opposed to the chucking mechanism 20.

Figure 12:
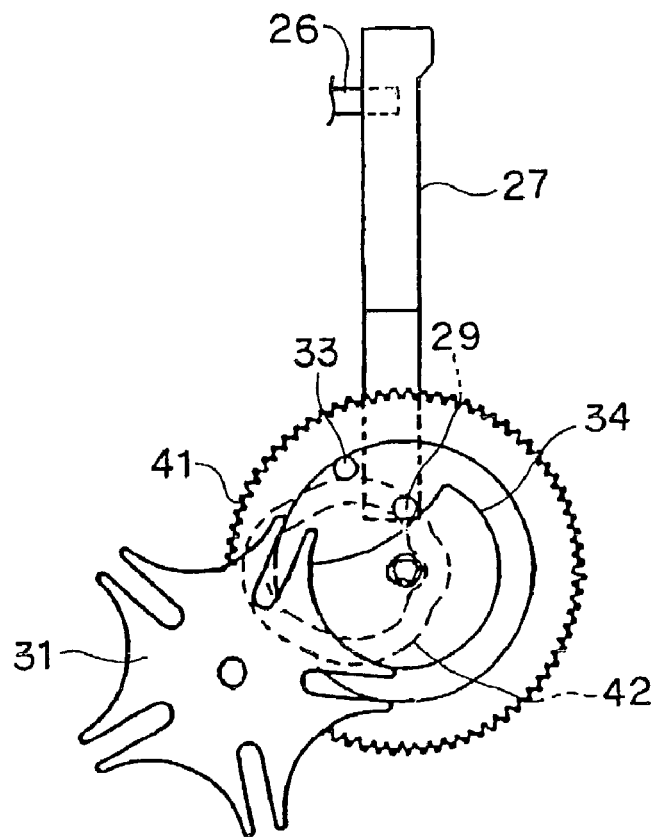
FIG. 12 is a schematic illustration for explaining still another operation of the operating section.

After that, when the motive gear 41 is normally rotated, the state returns to the state shown in FIG. 8 via the state shown in FIG. 12. Therefore, the engaging pin 29 engages with the connecting point 42d (shown in FIG. 6) of the cam groove 42 of the cam mechanism B and comes to the most distant position from the rotary central axis P of the motive gear 41. Due to the foregoing, the cam member 27 returns to the retreat limit, and the protrusion 26 engages with the hibh level portion 28a of the cam groove 28 explained in FIG. 7. Therefore, the chucking mechanism 20 is turned on. The engaging pin 33 of the disk 34 is located at the most distant position from the Geneva gear 31.

When normal rotation of the motive gear 41 is further continued, a series of operations shown in FIGS. 8 to 12 are repeated.

Under the condition that the slide tray 10 is closed, the rotating operation of the rotary tray 12 and the operations of the cam mechanism B and gear mechanism 30 for turning on and off the chucking mechanism 20 will be explained below, that is, the operation of the operating section 70 will be explained below.

Under the condition that the slide tray 10 is closed, the state in which the motive gear 41 and the idler gear 66 are meshed with each other in the operating section 70 is the same as that explained in FIG. 5. When motor M is reversed counterclockwise in the state shown in FIG. 5, the central gear 61 is reversed, so that the idler gear 66 is rotated clockwise round its own axis being meshed with the central gear 61. Since a force is given to the idler gear 66 so that the idler gear 66 can be revolved counterclockwise round the central gear 61, the idler gear 66 can be maintained in a state in which the idler gear 66 is being meshed with the motive gear 41. Accordingly, the motive gear 41 is reversed counterclockwise by the idler gear 66. At the point of time when the motive gear 41 starts reversing counterclockwise, the engaging pin 29 engages with the connecting point 42d (shown in FIG. 6) of the cam groove 42 of the cam mechanism B, and the engaging pin 29 is most distant from the rotary central axis P of the motive gear 41. Therefore, the cam member 27 is located at the retreat limit, and the protrusion 26 engages with the high level portion 28a of the cam groove 28 explained in FIG. 7, so that the chucking mechanism 20 is turned on. Further, the engaging pin 33 of the disk 34 is located at the most distant position from the Geneva gear 31. This state is the same as the state shown in FIG. 8.

When the motive gear 41 is reversed as shown by the broken line arrow J in the state shown in FIG. 8, the disk 34 and the cam groove 42 are reversed round the rotary central axis P together with the motive gear 41. After that, at the point of time when the engaging pin 33 arrives at a position right before the groove 35 of the Geneva gear 31 as shown in FIG. 11 via the state shown in FIG. 12, the engaging pin 29 moves in the third section 42c (shown in FIG. 6) of the cam groove 42 and arrives at a position right before the first section 42a. When reverse rotation of the motive gear 41 is successively continued, the engaging pin 33 gets into the groove 35 of the Geneva gear 31. At the same time, the engaging pin 29 moves from the third section 42c of the cam groove 42 to the first section 42a. In this state, since the engaging pin 29 comes to the closest position to the rotary central axis P of the motive gear 41, the cam member 27 moves to the advance limit. Therefore, the protrusion 26 engages with the low level portion 28b of the cam groove 28 explained in FIG. 7, and the chucking mechanism 20 is turned off.

Figure 9:
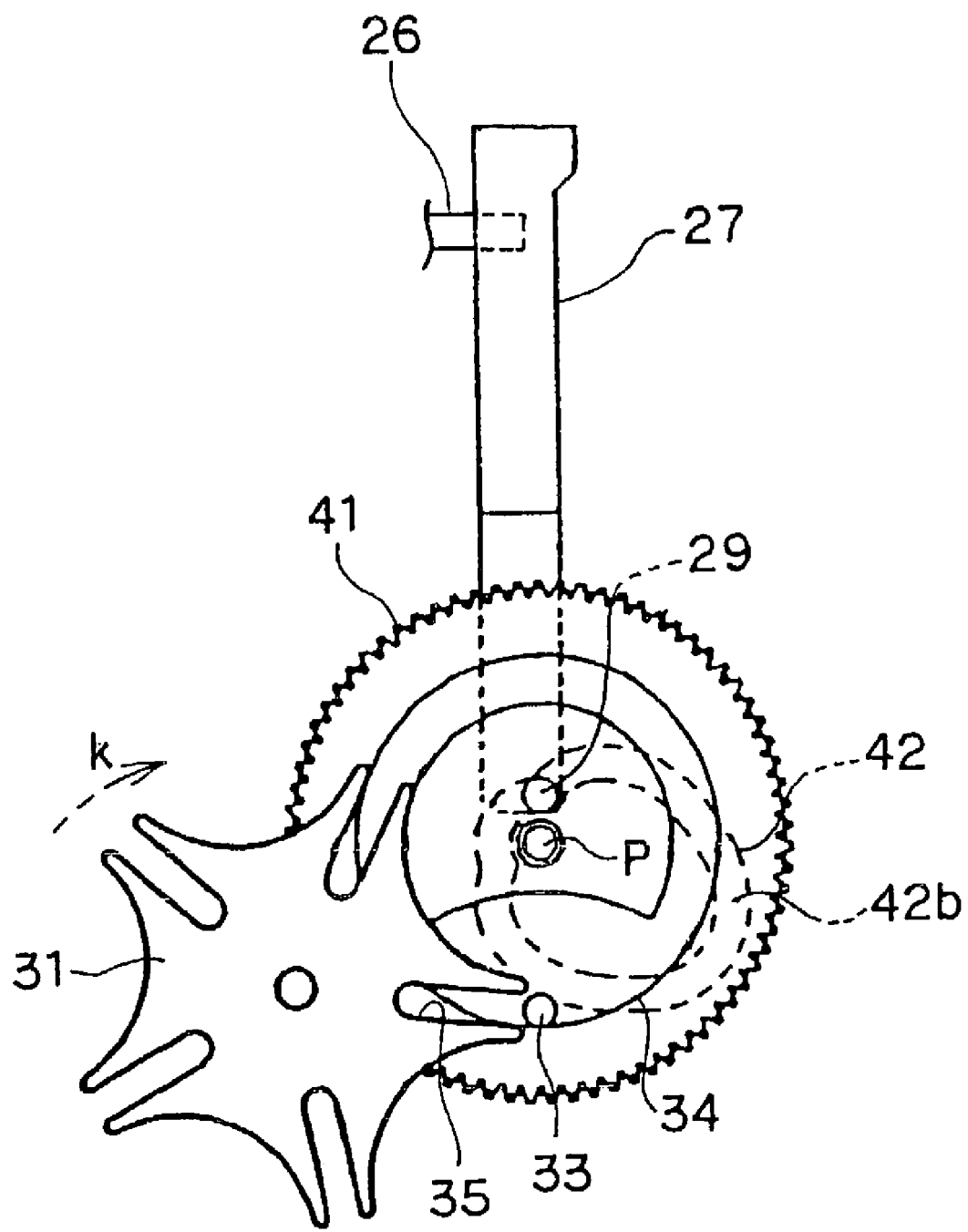
FIG. 9 is a schematic illustration for explaining another operation of the operating section.

When the motive gear 41 is further reversed in the state shown in FIG. 10, as shown in FIG. 9, the engaging pin 33 rotates the Geneva gear 31 counterclockwise by a predetermined angle as indicated by the broken line arrow "k". Then, the engaging pin 33 comes out from the groove 35 of the Geneva gear 31, and at the same time the engaging pin 29 moves from the first section 42a of the cam groove 42 to the second section 42b. During the operations conducted as shown in FIGS. 11, 10 and 9 in this order, a distance between the engaging pin 29 and the rotary central axis P is not changed. Therefore, the cam member 27 stops at the advance limit (chucking OFF state), and the rotary tray 12 is rotated counterclockwise by a predetermined angle, so that another disk setting section 13 is opposed to the chucking mechanism 20.

When the motive gear 41 is reversed after that, the device returns to the initial state shown in FIG. 8. Therefore, the engaging pin 29 engages with the connecting point 42d (shown in FIG. 6) of the cam groove 42 of the cam mechanism B, and the engaging pin 29 is located at the most distant position from the rotary central axis P of the motive gear 41. Due to the foregoing, the cam member 27 returns to the retreat limit, and the protrusion 26 engages with the high level portion 28a of the cam groove 28 explained in FIG. 7, so that the chucking mechanism 20 is turned on. Further, the engaging pin 33 of the disk 34 is located at the most distant position from the Geneva gear 31.

Further, when the motive gear 41 is reversed, a series of operations shown in FIGS. 8, 12, 11, 10 and 9 are successively repeated in this order.

The above series of operations conducted under the condition that the slide tray 10 is closed is necessary for automatically replacing a disk which is scanned by the optical pickup unit 22.

Figure 13:
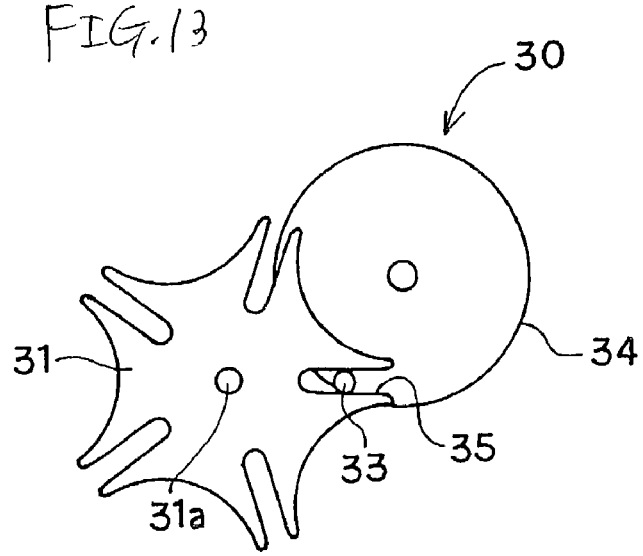
FIG. 13 is a schematic illustration for explaining an operation of a gear mechanism.
Figure 14:
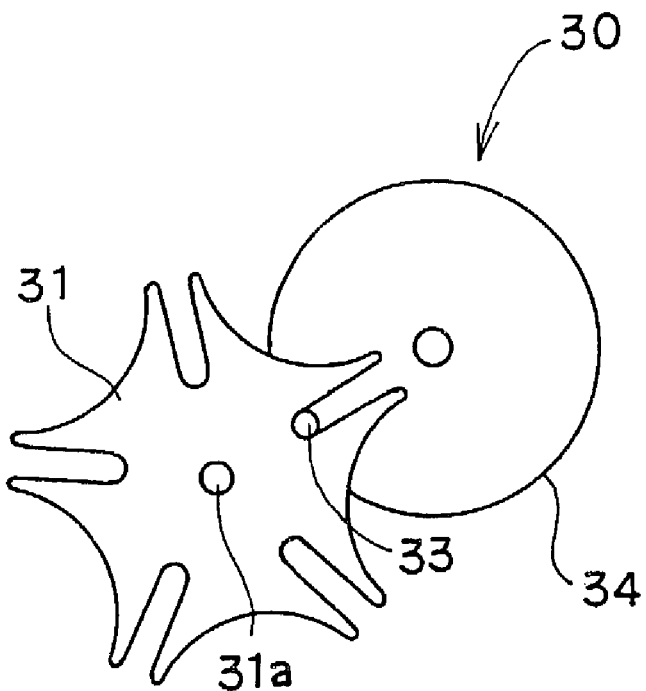
FIG. 14 is a schematic illustration for explaining another operation of the gear mechanism.
Figure 15:
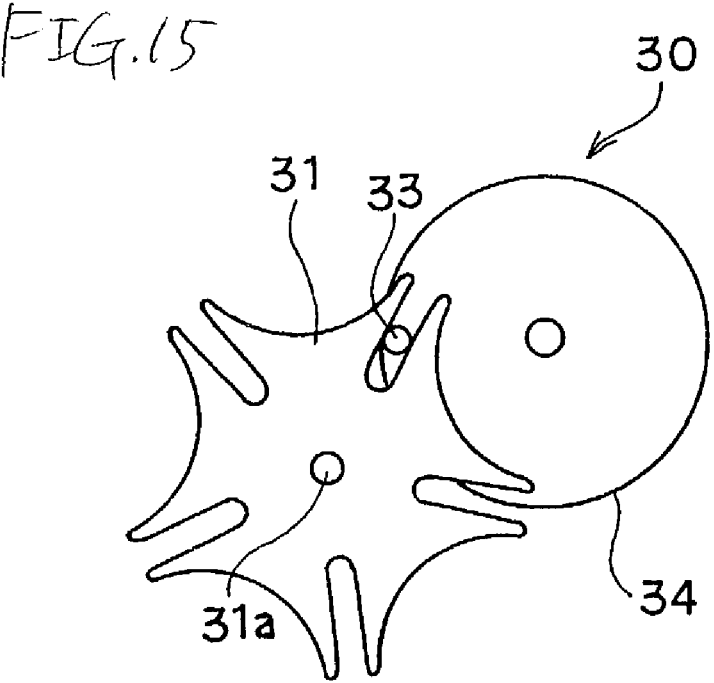
FIG. 15 is a schematic illustration for explaining still another operation of the gear mechanism.

In this embodiment, in order to intermittently rotate the rotary tray 12, the gear mechanism 30 is adopted in which the Geneva gear 31 and the engaging pin 33 are combined with each other. Therefore, after the rotary tray 12 has started rotating slowly, the rotating speed is increased, and then the rotating speed of the rotary tray 12 is decreased and finally the rotary tray 12 is stopped. This motion will be explained referring to FIGS. 13 to 15. FIG. 13 is a view showing a state immediately after the disk 34 is normally rotated and the engaging pin 33 gets into the groove 35 of the Geneva gear 31. When the disk 34 is normally rotated clockwise in this state, while the engaging pin 33 is approaching the center 31a of the Geneva gear 31, it reverses the Geneva gear 31 counterclockwise. In the mean time, the angular speed of the Geneva gear 31 is gradually increased. At the point of time when the engaging pin 33 comes to the closest position to the center 31a as shown in FIG. 14, a distance between the engaging pin 33 and the center 31a of the Geneva gear 31 becomes the shortest. Accordingly, the angular speed of the Geneva gear 31 is increased to the fastest. After that, while the engaging pin 33 is receding from the center 31a, it reverses the Geneva gear 31 counterclockwise. Therefore, the angular speed of the Geneva gear 31 is gradually decreased. In the case where the Geneva gear 31 is normally rotated clockwise by reverse rotation of the disk 34, the operations are conducted in the same manner.

Due to the foregoing, even if the disk changing speed is increased by reducing a period of time required for rotating the rotary tray 12 by a predetermined angle, it is possible to prevent the disk, which is set in the disk setting section 13, from jumping out when the rotary tray 12 starts rotating or stops.

According to the present invention, three operations including a rotary operation of the rotary tray, an operation of chucking on and off by the chucking mechanism and an operation of taking in and out (open/close) the slide tray can be conducted by one motor. Therefore, the manufacturing cost can be easily reduced in the embodiment of the present invention compared with the example of the prior art explained in the beginning of this specification. By utilizing the swinging mechanism, power generated by the motor is used for opening and closing the slide tray and also used for rotating the rotary tray and for chucking on and off by the chucking mechanism. Therefore, the structure of the embodiment of the present invention becomes simpler than the example of the prior art, which further contributes to a reduction of the manufacturing cost. Further, in order to turn on and off the chucking operation conducted by the chucking mechanism, the embodiment of the present invention does not use an elastic member, which is used in the example of the prior art, but the chucking operation is turned on and off by a reciprocating motion of the cam member. Therefore, when the chucking motion is turned on and off, a shock is not caused, which enhances the stability of recording and playback. According to the structure of the embodiment of the present invention, three operations including an operation of taking in and out the slide tray (opening/closing), an intermittent rotary operation of the rotary tray and an operation of chucking on an doff by the chucking mecha- nism can be continuously conducted at an appropriate timing. Therefore, the present invention can provide a disk device to be conveniently used.

What is claimed is:

1. A disk device comprising:

a device body;

a slide tray taken in and out from the device body;

a rotary tray mounted on the slide tray, the rotary tray having a plurality of disk setting sections arranged in the circumferential direction thereof;

a chucking mechanism attached to the slide tray for chucking a disk set in the disk setting section at a disk scanning position, a motive gear attached to the slide tray;

a gear mechanism including an engaging pin provided on the motive gear side and a Geneva gear arranged on the rotary tray and provided with a groove section to be engaged with and disengaged from this engaging pin, the gear mechanism converting continuous rotation of the motive gear into intermittent rotation of the rotary tray;

a cam member having a guide pin;

an endless cam groove provided in the motive gear for guiding the guide pin to reciprocate the cam member so that the chucking mechanism is changed over between a state of chucking on and a state of chucking off;

a rack for taking in and out the slide tray, the rack arranged in the device body and extending in a direction of taking in and out the slide tray;

a guide groove arranged in parallel with the rack;

a motor;

a central gear composed of a spur gear rotated by the motor, the central gear arranged on the slide tray at a position between the motive gear and the rack;

a connecting member pivotally connected with a support shaft of the central gear so that the connecting member is relatively rotated;

an idler gear composed of a spur gear always engaged with the central gear so that the idler gear can be selectively engaged with the motive gear or the rack when a direction of rotation of the central gear is changed over; and an engaging body for maintaining a state of engagement of the idler gear with the rack when the engaging body slides in the guide groove during taking in and out the slide tray, wherein an intermittent rotation of the rotary tray, an operation of taking in and out the slide tray and chucking on and off of the chucking mechanism during the rotary tray is stopped are conducted by power generated by the motor.

2. A disk device comprising:

a device body;

a slide tray taken in and out from the device body;

a rotary tray mounted on the slide tray, the rotary tray having a plurality of disk setting sections arranged in the circumferential direction thereof;

a chucking mechanism attached to the slide tray for chucking a disk set in the disk setting section at a disk scanning position, a motive gear attached to the slide tray;

an operating section for intermittently rotating the rotary tray and turning on and off a chucking motion conducted by the chucking mechanism when the motive gear is rotated;

a rack for taking in and out the slide tray, the rack arranged in the device body and extending in a direction of taking in and out the slide tray;

a motor; and an idler gear rotated by the motor and selectively engaged with the motive gear or the rack when a direction of rotation of the motor is changed over, wherein an intermittent rotation of the rotary tray, an operation of taking in and out the slide tray and chucking on and off of the chucking mechanism during the rotary tray is stopped are conducted by power generated by one motor.

3. A disk device according to claim 2, wherein the chucking mechanism is changed over between a state of chucking on and a state of chucking off by a reciprocating motion of a cam member, and the operating section includes a cam mechanism arranged in the motive gear, for reciprocating the cam member when the motive gear is rotated.

4. A disk device according to claim 2, wherein the operating section includes a gear mechanism for converting a continuous rotation of the motive gear into an intermittent rotation of the rotary tray.

5. A disk device according to claim 4, wherein the gear mechanism includes an engaging pin arranged on the motive gear side and a Geneva gear provided with a groove section with which the engaging pin is engaged and from which the engaging pin is disengaged.

6. A disk device according to claim 2, wherein the motor and the central gear rotated by the motor are arranged on the slide tray, and the idler gear is pivotally attached to a connecting member pivotally connected with a support shaft of the central gear so that the idler gear can be always engaged with the central gear.

7. A disk device comprising:

a device body;

a slide tray taken in and out from the device body;

a rotary tray mounted on the slide tray, the rotary tray having a plurality of disk setting sections arranged in the circumferential direction thereof;

a chucking mechanism attached to the slide tray for chucking a disk set in the disk setting section at a disk scanning position, a motive gear attached to the slide tray;

an operating section for intermittently rotating the rotary tray and turning on and off a chucking motion conducted by the chucking mechanism when the motive gear is rotated;

a rack for taking in and out the slide tray, the rack arranged in the device body and extending in a direction of taking in and out the slide tray;

a motor; and an idler gear rotated by the motor and selectively engaged with the motive gear or the rack when a direction of rotation of the motor is changed over, wherein an intermittent rotation of the rotary tray, an operation of taking in and out the slide tray and chucking on and off of the chucking mechanism during the rotary tray is stopped are conducted by power generated by one motor, wherein the motor and the central gear rotated by the motor are arranged on the slide tray, and the idler gear is pivotally attached to a connecting member pivotally connected with a support shaft of the central gear so that the idler gear can be always engaged with the central gear; and an idler gear posture maintaining member for maintaining a state of engagement of the idler gear with the rack when the slide tray is taken in and out, wherein the idler gear posture maintaining member is arranged in the device body.

8. A disk device comprising:

a device body;

a slide tray taken in and out from the device body;

a rotary tray mounted on the slide tray, the rotary tray having a plurality of disk setting sections arranged in the circumferential direction thereof;

a chucking mechanism attached to the slide tray for chucking a disk set in the disk setting section at a disk scanning position, a motive gear attached to the slide tray;

an operating section for intermittently rotating the rotary tray and turning on and off a chucking motion conducted by the chucking mechanism when the motive gear is rotated;

a rack for taking in and out the slide tray, the rack arranged in the device body and extending in a direction of taking in and out the slide tray;

a motor; and an idler gear rotated by the motor and selectively engaged with the motive gear or the rack when a direction of rotation of the motor is changed over, wherein an intermittent rotation of the rotary tray, an operation of taking in and out the slide tray and chucking on and off of the chucking mechanism during the rotary tray is stopped are conducted by power generated by one motor, wherein the motor and the central gear rotated by the motor are arranged on the slide tray, and the idler gear is pivotally attached to a connecting member pivotally connected with a support shaft of the central gear so that the idler gear can be always engaged with the central gear;

an idler gear posture maintaining member for maintaining a state of engagement of the idler gear with the rack when the slide tray is taken in and out, wherein the idler gear posture maintaining member is arranged in the device body, and includes a guide section arranged in the device body in parallel with the rack and an engaging body arranged in the connecting member and slidably engaged with the guide section so as to prevent swinging of the connecting member around the support shaft.

9. A disk device comprising:

a device body;

a slide tray taken in and out from the device body;

a rotary tray mounted on the slide tray, the rotary tray having a plurality of disk setting sections arranged in the circumferential direction thereof;

a chucking mechanism attached to the slide tray for chucking a disk set in the disk setting section at a disk scanning position, a motive gear attached to the slide tray;

an operating section for intermittently rotating the rotary tray and turning on and off a chucking motion conducted by the chucking mechanism when the motive gear is rotated;

a rack for taking in and out the slide tray, the rack arranged in the device body and extending in a direction of taking in and out the slide tray;

a motor; and an idler gear rotated by the motor and selectively engaged with the motive gear or the rack when a direction of rotation of the motor is changed over, wherein an intermittent rotation of the rotary tray, an operation of taking in and out the slide tray and chucking on and off of the chucking mechanism during the rotary tray is stopped are conducted by power generated by one motor, wherein the motor and the central gear rotated by the motor are arranged on the slide tray, and the idler gear is pivotally attached to a connecting member pivotally connected with a support shaft of the central gear so that the idler gear can be always engaged with the central gear;

an idler gear posture maintaining member for maintaining a state of engagement of the idler gear with the rack when the slide tray is taken in and out, wherein the idler gear posture maintaining member is arranged in the device body, and includes a guide section arranged in the device body in parallel with the rack and an engaging body arranged in the connecting member and slidably engaged with the guide section so as to prevent swinging of the connecting member around the support shaft; and wherein the guide section comprises are shaped auxiliary portions on both ends thereof, the engaging body engages with one auxiliary portion when the slide tray is opened, and engages with the other auxiliary portion when the slide tray is closed, thereby making the idler gear engage with the motive gear.

* * * * *